US006761811B2

(12) United States Patent
Mariella, Jr.

(10) Patent No.: US 6,761,811 B2
(45) Date of Patent: Jul. 13, 2004

(54) MULTI-STAGE SEPARATIONS BASED ON DIELECTROPHORESIS

(75) Inventor: Raymond P. Mariella, Jr., Danville, CA (US)

(73) Assignee: The Regents of the University of California, Oakland, CA (US)

(*) Notice: Subject to any disclaimer, the term of this patent is extended or adjusted under 35 U.S.C. 154(b) by 325 days.

(21) Appl. No.: 09/819,108

(22) Filed: Mar. 27, 2001

(65) Prior Publication Data

US 2002/0139674 A1 Oct. 3, 2002

(51) Int. Cl.[7] ..................... G01N 27/447; G01N 27/453
(52) U.S. Cl. ........................................ 204/547; 204/643
(58) Field of Search .................................. 204/547, 643

(56) References Cited

U.S. PATENT DOCUMENTS

| | | | | |
|---|---|---|---|---|
| 5,814,200 | A | 9/1998 | Pethig et al. | 204/547 |
| 5,858,192 | A | 1/1999 | Becker et al. | 204/547 |
| 5,993,630 | A | 11/1999 | Becker et al. | 204/547 |

FOREIGN PATENT DOCUMENTS

| | | | | |
|---|---|---|---|---|
| JP | 2000-125846 | * | 5/2000 | C12M/1/34 |
| WO | WO 97/34689 A1 | * | 9/1997 | B01J/19/00 |
| WO | WO 98/10869 A1 | * | 3/1998 | B03C/5/02 |

OTHER PUBLICATIONS

Suehiro et al. ("The dielectrophoretic movement and positioning of a biological cell using a three–dimensional grid electrode system," J. Phys. D. appl. Phys. 31 (1998) 3298–3305).*

JPO machine translation of Yatsunami (JP 2000–125846 A).*

* cited by examiner

*Primary Examiner*—Alex Noguerola
(74) *Attorney, Agent, or Firm*—Eddie E. Scott; Alan H. Thompson

(57) ABSTRACT

A system utilizing multi-stage traps based on dielectrophoresis. Traps with electrodes arranged transverse to the flow and traps with electrodes arranged parallel to the flow with combinations of direct current and alternating voltage are used to trap, concentrate, separate, and/or purify target particles.

6 Claims, 3 Drawing Sheets

MULTI-STAGE SEPARATIONS BASED ON DIELECTROPHORESIS

CROSS-REFERENCE TO RELATED APPLICATIONS

Some subject matter is disclosed and claimed in the following commonly owned, co-pending, U.S. patent application, "THREE DIMENSIONAL SEPARATION TRAP BASED ON DIELECTROPHORESIS," by Raymond P. Mariella, Jr., patent application Ser. No. 09/819,110, filed Mar. 27, 2001, which is hereby incorporated by reference in its entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to separator methods and apparatus and more particularly to dielectrophoresis separator methods and apparatus.

2. State of Technology

U.S. Pat. No. 5,814,200 for an apparatus for separating by dielectrophoresis by Pethig et al, patented Sep. 29, 1998, provides the following description: "The invention relates to a separator, which is particularly useful for separating cellular matter. The separator utilizes the phenomenon known as dielectrophoresis (DEP). A DEP force effects a particle suspended in a medium. The particle experiences a force in an alternating electric field. The force is proportional to, amongst other things, the electrical properties of the supporting medium and the particle and the frequency of the electric field. The separator, of the present invention, comprises a chamber (10) and a plurality of electrodes (12) disposed in the chamber (10). An electric field established across electrodes subjects some of the particles to a stronger force than others such that they are confined within the chamber. Particles which are not confined are removed from the chamber by the supporting medium which is preferably urged through the chamber. Valves (101 and 202) are provided on exhausts of the chamber. The invention is able to separate two different particles continuously."

U.S. Pat. No. 5,993,630 for a method and apparatus for fractionation using conventional dielectrophoresis and field flow fractionation, by Becker et al, patented Nov. 30, 1999, provides the following description: "The present disclosure is directed to a novel apparatus and novel methods for the separation, characterization, and manipulation of matter. In particular, the invention combines the use of frequency-dependent dielectric and conductive properties of particulate matter and solubilized matter with the properties of the suspending and transporting medium to discriminate and separate such matter. The apparatus includes a chamber having at least one electrode element and at least one inlet and one output port into which cells are introduced and removed from the chamber. Matter carried through the chamber in a fluid stream is then displaced within the fluid by a dielectrophoretic (DEP) force caused by the energized electrode. Following displacement within the fluid, matter travels through the chamber at velocities according to the velocity profile of the chamber. After the matter has transmitted through the chamber, it exits at the opposite end of the chamber at a characteristic position. Methods according to the invention involve using the apparatus for discriminating and separating matter for research, diagnosis of a condition, and therapeutic purposes. Examples of such methods may include separation of mixtures of cells, such as cancer cells from normal cells, separation of parasitized erythrocytes from normal erythrocytes, separation of nucleic acids, and others."

U.S. Pat. No. 5,858,192 for a method and apparatus for manipulation using spiral electrodes, by Becker et al, patented Jan. 12, 1999, provides the following description: "the present disclosure is directed to a novel apparatus and novel methods for the separation, characterization, and manipulation of matter. In particular, the invention combines the use of frequency-dependent dielectric and conductive properties of particulate matter and solubilized matter with the properties of a suspending medium to discriminate and separate such matter. The apparatus includes a chamber having at least one spiral electrode element. Matter is separated in the chamber by a dielectrophoretic (DEP) force caused by the energized electrode or electrodes."

SUMMARY OF THE INVENTION

The present invention separates target materials from other materials. Multi-stage traps based on dielectrophoresis are used to trap, concentrate, separate, and/or purify the particles. An embodiment of the invention utilizes traps with electrodes transverse to the flow and traps with electrodes in parallel to the flow with combinations of direct current and alternating voltage. The system can be used to manipulate biological or other matter including biological cells, molecules, and DNA. Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
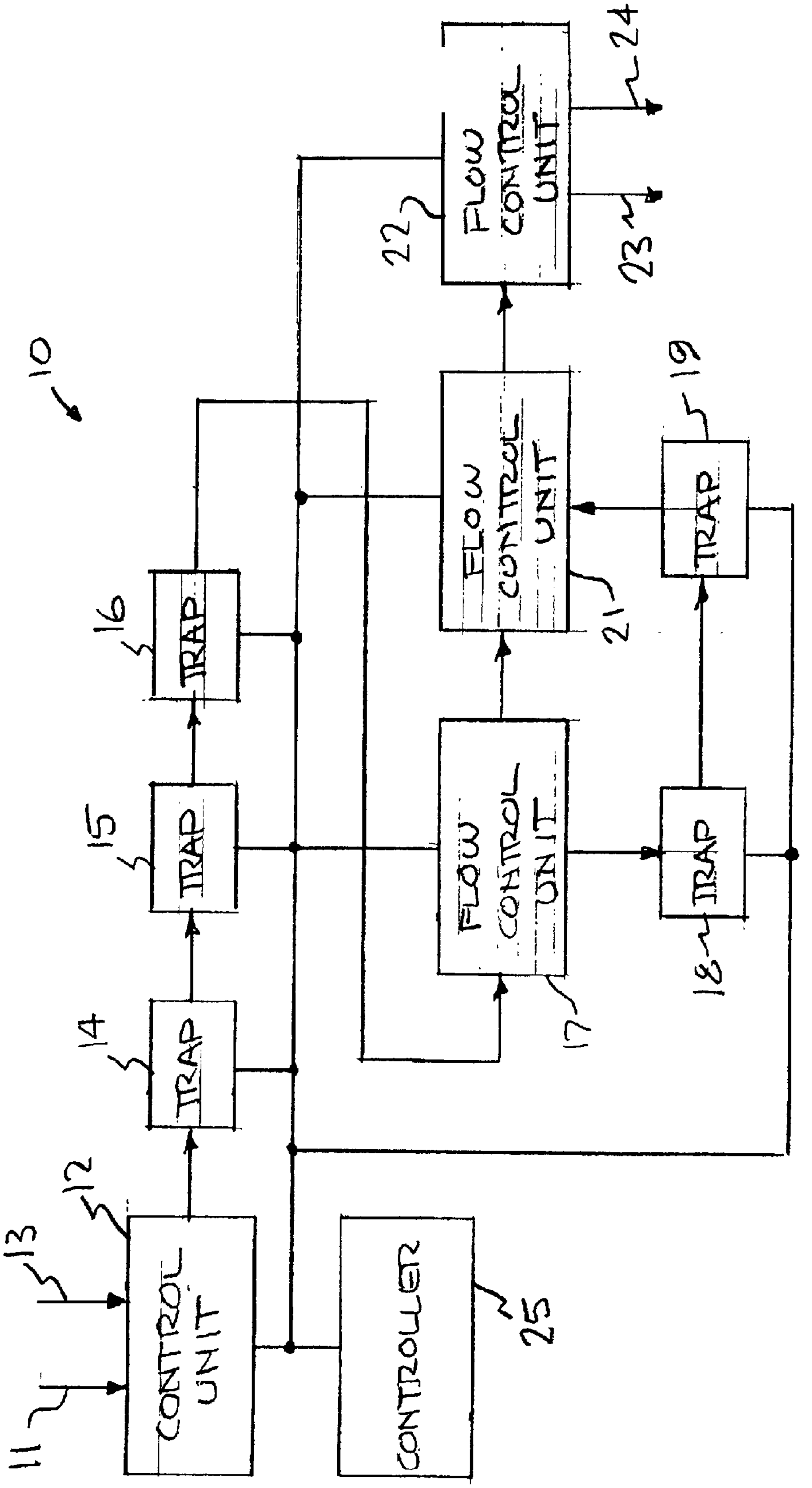
FIG. 1 illustrates an embodiment of the present invention.

Referring now to the drawings, specific embodiments of the invention are shown. In one embodiment of the present invention, a system is provided with traps having electrodes transverse to the flow and traps with electrodes in parallel to the flow, separated in space and time. The system utilizes multi-stage traps based on dielectrophoresis to trap, concentrate, separate, and/or purify desired particles. The system utilizes traps with electrodes transverse to the flow and traps with electrodes in parallel to the flow with combinations of direct current and alternating voltage. The system can be used to manipulate biological or other matter including biological cells, molecules, and DNA. The detailed description of the specific embodiments, together with the general description of the invention, serve to explain the principles of the invention.

Dielectrophoretic separators rely on the phenomenon that substances within a non-uniform DC or AC electric field experience a dielectrophoretic force. The dielectrophoretic force causes the substance, which may be gaseous, liquid, solid, or dissolved in solution, to move within the field. The dielectrophoretic field can have different effects upon different substances. This effect may be used to filter or separate substances, usually solids in suspension, from a liquid for the purposes of analysis.

Referring to FIG. 1, an embodiment of a system constructed in accordance with the present invention is illustrated. The system, designated generally by the reference numeral 10, provides the collection, separation, and purification of particles and/or molecules from a flowing fluid using dielectrophoresis. Dielectrophoresis has been generally employed for separation of matter, utilizing particle density, size, volume, diffusivity, thickness, and surface charge as parameters. The technique can be used to separate many different types of matter including, for example, biological and non-biological matter. Separation by dielectrophoresis occurs by differential retention in a stream of liquid flowing through a thin channel. The technique generally requires the presence of a field or gradient. The field is applied to the flow and serves to drive the matter into different displacements within the flow profile.

Free ions can be pulled out of solution or, at least, can be deflected away from the rest of the flow stream by using a direct current bias. The molecules or particles with larger dielectric polarizabilities can be drawn away from the center of the flow stream by applying an independent alternating current. By arranging the electrodes in parallel with the direction of flow, the dielectrophoretic separation is improved. This allows the use of greater volumetric flow; larger cross-sectional areas or just higher speed transport of the bulk fluid through the trap. This has the disadvantage of spreading out the desired trapped molecules or particles ("target") over a larger surface area than could be achieved via a trap with transverse electrodes.

The system 10 answers this problem by using both styles of traps, separated in space and time. The system 10 utilizes multi-stage traps based on dielectrophoresis to trap, concentrate, separate, and/or purify desired particles. The system 10 utilizes traps with electrodes transverse to the flow and traps with electrodes in parallel to the flow with combinations of direct current and alternating voltage. The system 10 can be used to manipulate biological or other matter including biological cells, molecules, and DNA.

A stream 13 containing target particles or molecules enters the flow control unit 12. Also entering the flow control unit 12 is a stream 11 of fresh wash or wash with reagents. The stream leaving flow control unit 12 is directed through traps 14, 15, and 16. The stream leaving trap 16 is directed to flow control unit 17. Flow control unit 17 can divert the stream through traps 18 and 19. After leaving traps 18 and 19 the stream travels through flow control unit 21 to flow control unit 22. The waste steam 24 leaves the system through flow control unit 22. The target particles leave flow control unit 22 through stream 23 and are directed to assays. A controller 25 monitors and actuates flow control units 12, 17, 21, and 22. Controller 25 also monitors, actuates, and adjusts traps 14, 15, 16, 18, and 19.

The dielectrophoretic traps 14, 15, 16, 18, and 19 are adapted to have electrodes placed transverse to the flow and electrodes in parallel to the flow with combinations of direct current and alternating voltage. It is to be understood that various combinations of dielectrophoretic traps 14, 15, 16, 18, and 19 with electrodes placed transverse to the flow and electrodes placed in parallel to the flow with combinations of direct current and alternating voltage can be utilized. An example will be described in reference to FIG. 1. Traps 14, 15, and 16 are based on dielectrophoresis with the electrodes parallel to the flow direction. Traps 14, 15, and 16 can be used with direct current or alternating voltage. Traps 18 and 19 are traps based on dielectrophoresis with the electrodes transverse to the flow direction. Traps 18 and 19 can be used with direct current or alternating voltage.

Figure 2:
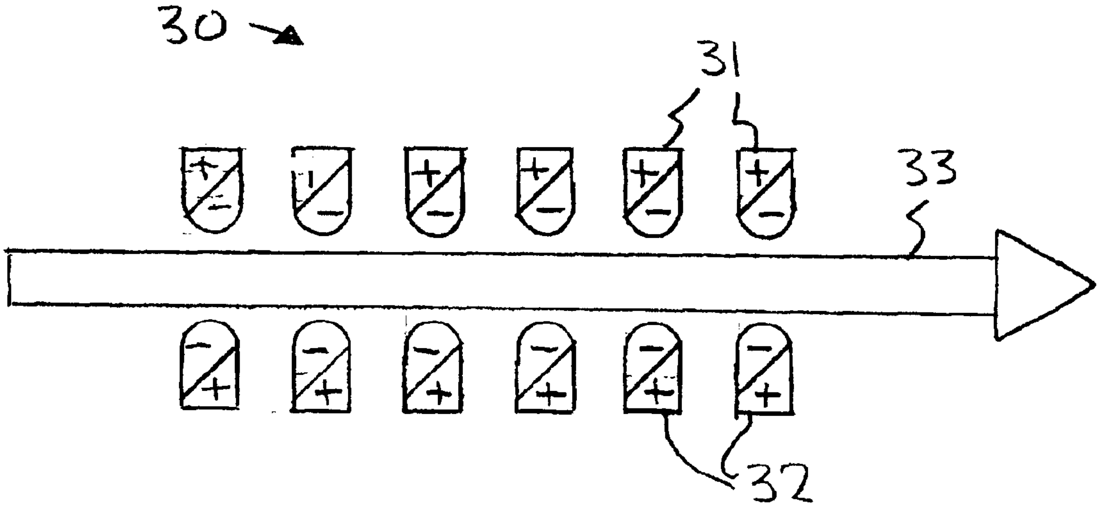
FIG. 2 shows a trap with electrodes transverse to the flow direction.

Referring now to FIG. 2, a transverse-electrode trap, generally designated by the reference numeral 30 is shown. The transverse-electrode trap 30 can be used as one or more of the traps shown in FIG. 1. By way of example the trap 30 is used as the trap 18 shown in FIG. 1. The electrodes 31 and 32 in trap 30 are located transverse to the flow 33 of target materials and other materials. The trap 30 can be used for the collection, separation, and purification of particles and/or molecules from a flowing fluid using dielectrophoresis. The trap 30 is based on dielectrophoresis with the electrodes transverse to the flow direction. Trap 30 can be used with direct current or alternating voltage. The electrodes 31 and 32 would alternate between "+" and "−" when used with alternating voltage. One of the electrodes 31 and 32 would be "+" and the other of the electrodes 31 and 32 would be "−" when used with direct current. For example, electrodes 31 shown in FIG. 2 would be "+" and electrodes 3 shown in FIG. 2 would be "−" when used with direct current in one embodiment of the present invention. By energizing the electrodes 31 and 32 that are arranged generally transverse to the flow of the target materials and other materials, the target materials are separated from the other materials.

Figure 3:
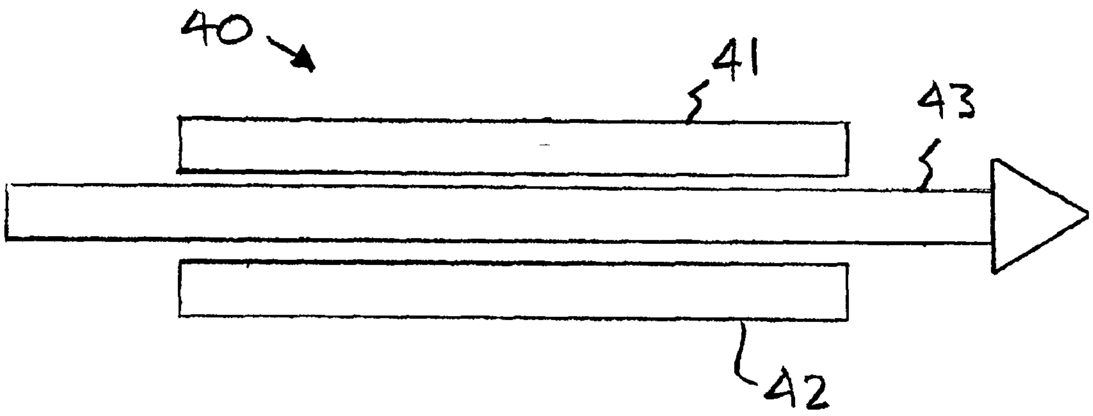
FIG. 3 shows a trap with electrodes parallel to the flow direction.

Referring now to FIG. 3, a parallel-electrode trap, generally designated by the reference numeral 40 is shown. The parallel-electrode trap 40 can be used as one or more of the traps shown in FIG. 1. By way of example the trap 40 is used as the trap 14 shown in FIG. 1. The electrodes 41 and 42 in trap 30 are located parallel to the flow 43 of target materials and other materials. The trap 40 can be used for the collection, separation, and purification of particles and/or molecules from a flowing fluid using dielectrophoresis. The trap 40 is based on dielectrophoresis with the electrodes parallel to the flow direction 43. Trap 40 can be used with direct current or alternating voltage. By energizing the electrodes 41 and 42 that are arranged generally parallel to the flow of the target materials and other materials, the target materials are separated from the other materials. The electrodes 41 and 42 in trap 40 can be three dimensional electrodes such as those shown in commonly owned, co-pending, U.S. patent application, "THREE DIMENSIONAL SEPARATION TRAP BASED ON DIELECTROPHORESIS," by Raymond P. Mariella, Jr., patent application Ser. No. 09/819,110, filed Mar. 27, 2001, which is hereby incorporated by reference in its entirety.

Multiple DiEP traps, such as those constructed as shown in FIG. 3, can be used for the traps 14, 15, and 16 in FIG. 1. The multiple DiEP traps 40 are located in series, each operating at a different AC frequency that is particularly effective at trapping one target particle or molecule. Using this arrangement it is possible to produce a DiEP "filter" that traps multiple species at different spatial locations. The first filter, operating at 30 Hz, traps particles, such as DNA, responding to the lowest frequency AC fields; the second filter operates at 30 Khz and traps vegetative bacteria; the final filter operates at 30 Mhz and traps spores. Each trap 40 has a different length. Some targets are easier to trap than others.

The structural elements of the system 10 having now been identified, the operation of the system 10 will now be described. By arranging multiple DiEP traps 14, 15, and 16 with electrodes parallel to the flow in series, each operating at a different AC frequency that is particularly effective at trapping one target particle or molecule, it is possible to produce a DiEP "filter" that traps multiple species at different spatial locations. The first trap 14, operating at 30 Hz, traps particles, such as DNA, responding to the lowest frequency AC fields; the second trap 15 operates at 30 Khz and traps vegetative bacteria; the third trap 16 operates at 30 Mhz and traps spores. Each trap has a different length. Some targets are easier to trap than others.

Once the multiple targets are trapped, each one is released individually or with others under slower flow conditions to be concentrated at the transverse-electrode trap. So long as a trap works both with the original fluid and a second fluid, which might be cleaner or might contain reagents, or both, then the trapped target can be transported into a sample preparation region that included reagents, sonication, temperature control, light, etc.

The fluidic system incorporates a microfluidic side loop into which the concentrated sample could be released for sample preparation, such as spore lysis, after which the prepared sample could be passed over to traps 18 and 19 to separate DNA from the debris that results from the spore preparation. Similarly, RNA viruses can be treated with reverse transcriptase, which produces the virus' DNA signature. In both of these latter two examples, the DNA that resulted from the sample preparation procedures can be trapped and, thereby, cleaned up with a low-frequency DiEP trap for later re-release and analysis.

The system 10 is started by operating with higher volumetric flow rate, and trap the target over the large surface-area parallel-electrode traps 14, 15, and 16. During this step, the overall efficiency of trapping of target is maximized. After operating the first traps 14, 15, and 16 for a period of time, the flow rate is reduced and the target is released from the parallel-electrode traps 14, 15, and 16 back into the fluid, to be trapped by the smaller transverse-electrode traps 18 and 19. If the flow rate has been sufficiently reduced, then the second traps 18 and 19 can efficiently re-capture the target, but this time it will be trapped onto a small surface area. Thus, the target will have been removed efficiently from the original fluid and will have been concentrated to a much greater extent than through the use of only the first traps.

Once this has been accomplished, the target can be re-released into a much smaller volume of fluid. In this manner, the desired target can be isolated and concentrated into a desired fluid. It can be re-released into different fluids than that which originally contained the target, so long as the traps continued to retain the target during the switchover of fluids. This allows the introduction of a cleaner carrier fluid for performing sample preparation or assays, or the fluid could contain reagents that might preserve, denature, or activate the target for later use.

By arranging multiple parallel DiEP traps 14, 15, and 16 in series, each operating at a different AC frequency that is particularly effective at trapping one target particle or molecule, it is possible to produce a DiEP "filter" that traps multiple species at different spatial locations.

Once the multiple targets are trapped, each one could be released individually or with others under slower flow conditions to be concentrated at the transverse-electrode trap. So long as a trap works both with the original fluid and a second fluid, which might be cleaner or might contain reagents, or both, then the trapped target could be transported into a sample preparation region that included reagents, sonication, temperature control, light, etc. Therefore, the fluidic system could incorporate a microfluidic side loop into which the concentrated sample could be released for sample preparation, such as spore lysis, after which the prepared sample could be passed over a transverse-electrode trap to separate DNA from the debris that results from the spore preparation. Similarly, RNA viruses could be treated with reverse transcriptase, which would produce the virus' DNA signature. In both of these latter two examples, the DNA that resulted from the sample preparation procedures could be trapped and, thereby, cleaned up with a low-frequency DiEP trap for later re-release and analysis.

Figure 4:
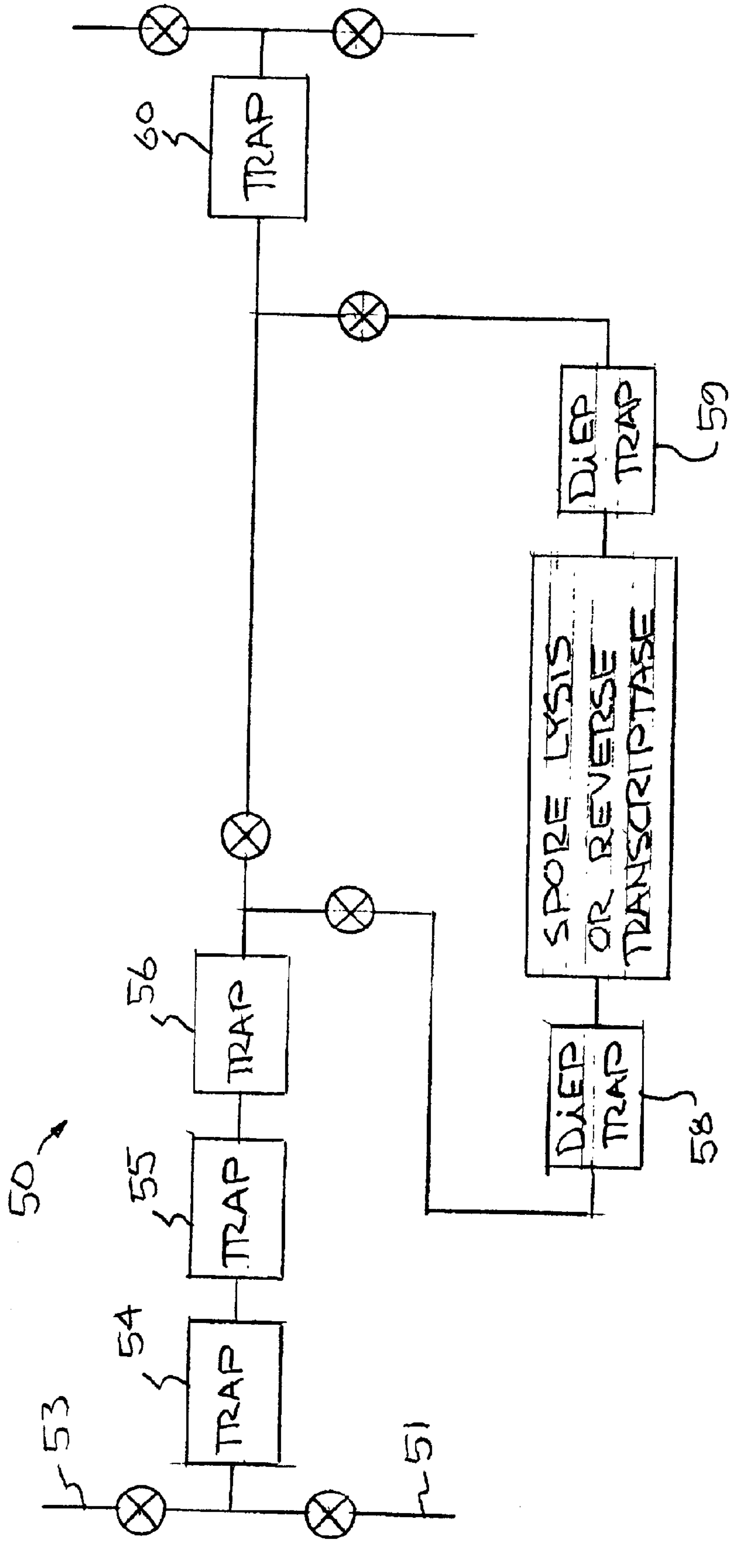
FIG. 4 illustrates another embodiment of the present invention.

Referring now to FIG. 4 another embodiment of the present invention is illustrated. The system 50 uses both traps with electrodes parallel to the flow direction and traps with electrodes transverse to the flow direction separated in space and time. The system 50 utilizes multi-stage traps based on dielectrophoresis to trap, concentrate, separate, and/or purify desired particles. The system 50 utilizes traps in series to the flow and in parallel to the flow with combinations of direct current and alternating voltage. The system 10 can be used to manipulate biological or other matter including biological cells, molecules, and DNA.

A stream 53 containing target particles or molecules enters trap 54. Also entering trap 54 is a stream 51 of fresh wash or wash with reagents. The stream leaving trap 54 is directed through traps 55, and 56. The stream leaving trap 56 can be diverted through traps 58 and 59. After leaving traps 58 and 59 the stream travels through trap 60.

The dielectrophoretic traps 54, 55, 56, 58, 59, and 60 have electrodes placed transverse to the flow and in parallel to the flow with combinations of direct current and alternating voltage. It is to be understood that various combinations of dielectrophoretic traps 54, 55, 56, 58, 59, and 60 can be placed in series to the flow and in parallel to the flow with combinations of direct current and alternating voltage. An example will be described in reference to FIG. 4. Traps 54, 55, and 56 are based on dielectrophoresis with the electrodes parallel to the flow direction. Traps 54, 55, and 56 can be used with direct current or alternating voltage. Traps 58 and 59 are traps based on dielectrophoresis with the electrodes transverse to the flow direction. Traps 58 and 59 can be used with direct current or alternating voltage. Trap 60 has electrodes placed transverse to the flow and in parallel to the flow with combinations of direct current and alternating voltage.

The fluidic system incorporates a microfluidic side loop into which the concentrated sample could be released for sample preparation, such as spore lysis, after which the prepared sample could be passed over to traps 58 and 59 to separate DNA from the debris that results from the spore preparation. Similarly, RNA viruses can be treated with reverse transcriptase, which produces the virus' DNA signature. In both of these latter two examples, the DNA that resulted from the sample preparation procedures can be trapped and, thereby, cleaned up with a low-frequency DiEP trap 60 for later re-release and analysis.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A dielectrophoresis separator apparatus for separating target materials from other materials in a flow of said target materials and said other materials, comprising:

a first trap adapted to receive said target materials and said other materials, said first trap having electrodes arranged generally parallel to said flow of said target materials and said other materials, a second trap adapted to receive said target materials and said other materials, said second trap having electrodes arranged generally transverse to said flow of said target materials and said other materials, and a source of direct current operatively connected to said electrodes arranged generally parallel to said flow of said target materials and said other materials in said first trap.

2. The dielectrophoresis separator apparatus of claim 1 including a source of alternating voltage operatively connected to said electrodes arranged generally transverse to said flow of said target materials and said other materials in said second trap.

3. A dielectrophoresis separator apparatus for separating target materials from other materials in a flow of said target materials and said other materials, comprising:

a first trap adapted to receive said target materials and said other materials, said first trap having electrodes arranged generally parallel to said flow of said target materials and said other materials, a second trap adapted to receive said target materials and said other materials, said second trap having electrodes arranged generally transverse to said flow of said target materials and said other materials, and a source of direct current operatively connected to said electrodes arranged generally transverse to said flow of said target materials and said other materials in said second trap.

4. The dielectrophoresis separator apparatus of claim 3 including a source of alternating voltage operatively connected to said electrodes arranged generally parallel to said flow of said target materials.

5. A dielectrophoresis separation method for separating target materials from other materials from a flow of said target materials and said other materials, comprising the steps of:

flowing said target materials and said other materials through a first trap, energizing in said first trap electrodes arranged generally parallel to said flow of said target materials and said other materials by energizing a source of direct current operatively connected to said electrodes arranged generally parallel to said flow of said target materials and said other materials in said first trap, flowing said target materials and said other materials through a second trap, and energizing in said second trap electrodes arranged generally transverse to said flow of said target materials and said other materials.

6. The dielectrophoresis separation method of claim 5 including energizing a source of alternating voltage operatively connected to said electrodes arranged generally transverse to said flow of said target materials and said other materials in said second trap.

* * * * *